(12) United States Patent
Shon et al.

(10) Patent No.: US 8,132,941 B2
(45) Date of Patent: Mar. 13, 2012

(54) PORTABLE TERMINAL HAVING TRANSPARENT COVER MEMBER

(75) Inventors: Bum-Seok Shon, Gyeonggi-Do (KR); Young-Hwan Kim, Seoul (KR); Joon-Hee Yoo, Incheon (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 12/468,783

(22) Filed: May 19, 2009

(65) Prior Publication Data

US 2010/0079996 A1 Apr. 1, 2010

(30) Foreign Application Priority Data

Sep. 26, 2008 (KR) .................. 10-2008-0094961

(51) Int. Cl.
*F21V 3/00* (2006.01)
(52) U.S. Cl. .................. 362/311.01; 362/97.1; 362/109; 362/246; 362/311.02; 362/311.14
(58) Field of Classification Search ........ 362/97.1–97.4, 362/109, 227, 234, 235, 244, 246, 249.02, 362/311.01, 311.02, 311.14, 613, 800
See application file for complete search history.

(56) References Cited

U.S. PATENT DOCUMENTS

| | | | |
|---|---|---|---|
| 2005/0253980 A1* | 11/2005 | Saito et al. | 349/64 |
| 2007/0051960 A1* | 3/2007 | Yu | 257/88 |

* cited by examiner

*Primary Examiner* — Stephen F Husar
*Assistant Examiner* — Meghan Dunwiddie
(74) *Attorney, Agent, or Firm* — Lee, Hong, Degerman, Kang & Waimey

(57) ABSTRACT

Disclosed is a portable terminal having a transparent member at an outside thereof, including a terminal body having at least one light emitting member, and a transparent cover member partially forming an outer appearance of the terminal body and transmitting light from the light emitting members to the outside. The transparent cover member includes a light diffusion pattern portion for scattering light from the light emitting members so as to minimize an occurrence of a case in which a specific position where the light emitting member is formed is brightly illuminated but other position is dimmed.

19 Claims, 11 Drawing Sheets

PORTABLE TERMINAL HAVING TRANSPARENT COVER MEMBER

CROSS-REFERENCE TO RELATED APPLICATIONS

Pursuant to 35 U.S.C. §119, this application claims the benefit and earlier filing date of Korean Application No. 10-2008-0094961, filed on Sep. 26, 2008, which is herein expressly incorporated by reference in its entirety.

BACKGROUND OF THE INVENTION

1. Field of the Invention

The present invention relates to a portable terminal having a transparent member at an outside thereof.

2. Background of the Invention

A portable terminal is a portable device such as a mobile telephone or a personal digital assistant which is equipped with one or more functions including a voice/video communication function, an information input/output function, a data storage function, and the like.

As these functions become diversified, the portable terminal has been implemented as an integrated multimedia player which incorporates a variety of complicated functions, such as capturing images or video, replaying music files or video files, playing games, and receiving broadcasts.

Efforts are ongoing to support and increase the functionality of portable terminals in the form of various software and hardware improvements. As an example, a user interface environment is provided in a portable terminal to enable a user to easily and conveniently search for or select among available functions.

Because many users are interested in the aesthetic appeal of portable terminals as a means to express the users' personalities, greater attention has recently been drawn in the industry to making advancements to the external appearance and design of the portable terminal. For instance, the portable terminal may use a transparent material so as to implement lighting effects.

SUMMARY OF THE INVENTION

In one aspect, a portable terminal includes a body, a plurality of light emitting members formed within the body, and a transparent cover member disposed at an edge of the body, the transparent cover member including a first diffusion pattern configured to diffuse incident light received from the plurality of light emitting members and a second diffusion pattern configured to diffuse light received from the first diffusion pattern.

In another aspect, a portable terminal includes at least one case, a substrate disposed within the at least one case, at least one light emitting member formed on the substrate, and a transparent cover member coupled to an edge of the at least one case, the transparent cover member comprising a first diffusion pattern configured to diffuse light received from the at least one light emitting member and a second diffusion pattern configured to diffuse light received from the first diffusion pattern.

The second diffusion pattern may include a plurality of through holes, with the plurality of through holes arranged in a row. In one embodiment, an interval between adjacent through holes is less than an interval between adjacent light emitting members. The first diffusion pattern may include an indentation on a light incident surface of the transparent cover member.

The body of the portable terminal may include at least one case and the transparent cover member may include first and second portions, the first portion being externally exposed and the second portion being internal to the at least one case. The second portion may further include a plurality of protrusions, each protrusion comprising a coupling hole for connecting the transparent cover member to the at least one case.

The first diffusion pattern may include a pattern formed underneath a light incident surface of the transparent cover member. The indentation may include any one of a semi-circular, triangular, rectangular, or oval shape.

The portable terminal may further include a substrate, wherein the plurality of light emitting members is arranged in a row on a surface of the substrate. The substrate may include a display disposed on at least one side thereof.

The transparent cover member may be disposed at opposing edges of the body, along the perimeter of the body, or in another configuration.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will be given in detail of the portable terminal according to the present invention, examples of which are illustrated in the accompanying drawing. For reference, suffixes "module" and "portion" of components used in the following description are given or used for facilitating the preparation of this specification. Thus, the suffixes are not meant to have different meanings or functions from each other.

A portable terminal may be implemented as various types. For instance, the terminal in the present invention may include a portable (mobile) terminal, such as a cellular phone, a smart phone, a notebook computer, a digital multimedia broadcasting terminal, a Personal Digital Assistant (PDA), a Portable Multimedia Player (PMP), a navigation, and the like, and a stationary terminal, such as a digital TV, a desktop computer, and the like. Hereinafter, descriptions of the portable terminal will be given. However, it will be apparent to those skilled in the art that the configuration in the following description may also be applied to the stationary terminal except for any components specifically designed for the portable terminal.

Figure 1:
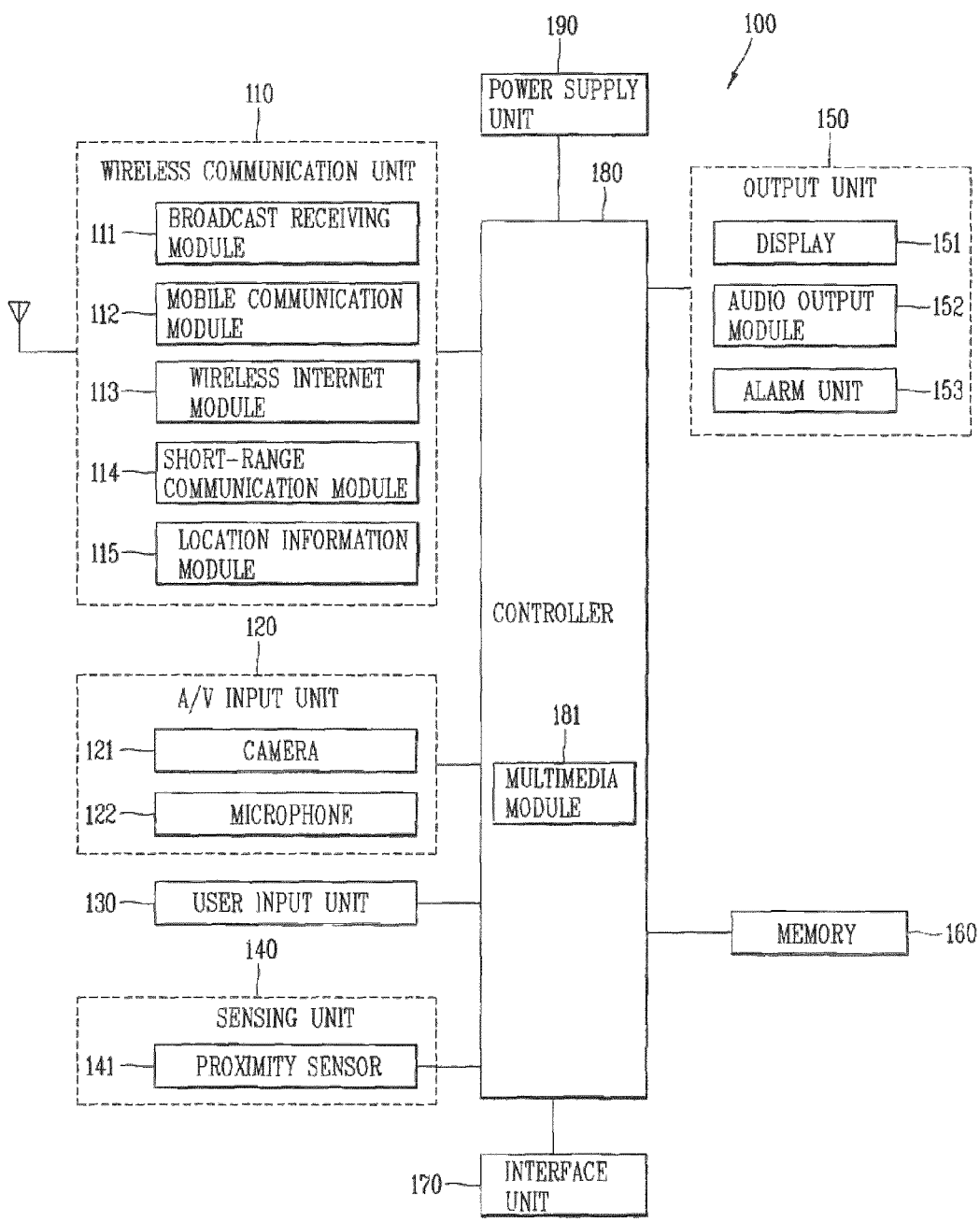
FIG. 1 is a block diagram of a portable terminal according to one exemplary embodiment of the present invention.

FIG. 1 is a block diagram of a portable terminal according to one exemplary embodiment of the present invention.

The portable terminal 100 may include a wireless communication unit 110, an Audio/Video (A/V) input unit 120, a user input unit 130, a sensing unit 140, an output unit 150, a memory 160, an interface unit 170, a controller 180, a power supply 190, and the like. FIG. 1 shows the portable terminal having various components, but it is to be understood that implementing all of the illustrated components is not a requirement. A greater or fewer number of components may alternatively be implemented.

Hereinafter, the components of the portable terminal will be described in more detail.

The wireless communication unit 110 typically includes one or more modules allowing radio (wireless) communication between the portable terminal 100 and a wireless communication system or a network within which the portable terminal is located. The wireless communication unit 110 may include a broadcast receiver module 111, a mobile communication module 112, a wireless internet module 113, a short-range communication module 114, a position-location module 115, and the like.

The broadcast receiver module 111 receives a broadcast signal and/or broadcast associated information from an external broadcast managing server via a broadcast channel. The broadcast channel may include a satellite channel and a terrestrial channel. The broadcast managing server may refer to a server that generates and transmits a broadcast signal and/or broadcast associated information or a server that receives a previously generated broadcast signal and/or broadcast associated information and transmits the same to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may be provided also via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), an electronic service guide (ESG) of digital video broadcast-handheld (DVB-H), and the like.

The broadcast receiver module 111 may be configured to receive broadcast signals using various types of broadcast systems. In particular, the broadcast receiver module 111 may receive a digital broadcast signal using a digital broadcast system, such as Digital Multimedia Broadcasting-Terrestrial (DMB-T), Digital Multimedia Broadcasting-Satellite (DMB-S), a media forward link only (MediaFLO®), Digital Video Broadcast-Handheld (DVB-H), Integrated Services Digital Broadcast-Terrestrial (ISDB-T), and the like. The broadcast receiver module 111 is configured to be suitable for every broadcast system that provides a broadcast signal as well as the above-mentioned digital broadcast systems.

A broadcast signal and/or broadcast-associated information received via the broadcast receiver module 111 may be stored in the memory 160.

The mobile communication module 112 transmits/receives radio signals to/from at least one of a base station, an external terminal and a server in a mobile communication network. Such radio signals may include a voice call signal, a video call signal or various types of data according to text/multimedia message transmission/reception.

The wireless internet module 113 supports Internet access for the portable terminal. This module 113 may be internally or externally coupled to the portable terminal 100. Examples of such wireless internet technologies may include a Wireless LAN (WLAN) (Wi-Fi), a Wireless broadband (Wibro), a World Interoperability for Microwave Access (Wimax), High Speed Downlink Packet Access (HSDPA) and the like.

The short-range communication module 114 refers to a module for supporting short range communications. Some examples of short-range communication technology include BLUETOOTH, Radio Frequency Identification (RFID), Infrared Data Association (IrDA), Ultra-WideBand (UWB), ZigBee™, and the like.

The position-location module 115 identifies or otherwise obtains the location of the portable terminal. If desired, this module may be implemented using Global Positioning System (GPS) components. For instance, the GPS module 115 may accurately calculate a 3-D current location of the terminal based on latitude, longitude and height by trigonometric measurement which measures accurate time and distance from three or more satellites and uses 3 different distance values. The GPS module 115 may use a method which obtains time and distance information from 3 satellites and corrects an error with one satellite. In addition, the GPS module 115 may obtain speed information by continuously calculating the current position in real-time.

The A/V input unit 120 is configured to input an audio or video signal. The A/V input unit 120 may include a camera 121 and a microphone 122. The camera 121 processes image frames of still pictures or videos obtained by an image capture device in an image capturing mode or a video call mode. The processed image frames may be displayed on the display 151.

The image frames processed by the camera 121 may be stored in the memory 160 or transmitted via the wireless communication unit 110. Two or more cameras 121 may be provided according to the configuration of the portable terminal.

The microphone 122 may receive an external analog audio signal (audible sound) in a phone call mode, a recording mode, a voice recognition mode, or the like, and process it into digital data. The processed audio (voice) data may be converted for output into a format transmittable to a mobile communication base station via the mobile communication module 112 in case of the phone call mode. The microphone 122 may include various types of noise canceling (or suppression) algorithms to cancel (or suppress) noise generated in the course of receiving and transmitting audio signals.

The user input unit 130 may generate key input data inputted by a user to control various operations of the portable terminal. The user input unit 130 may include a keypad, a dome switch, a touch pad (e.g., a touch sensitive member that detects changes in resistance, pressure, capacitance, or the like), a jog wheel, a jog switch, and the like. In particular, when a touch pad is overlaid on the display 151 in a layered manner, it may be referred to as a touch screen.

The sensing unit 140 detects a current status (or state) of the portable terminal 100, such as an opened/closed state of the portable terminal 100, a location of the portable terminal 100, a presence or absence of user contact with the portable terminal 100, orientation or acceleration/deceleration of the portable terminal 100, and the like, and generates commands or signals for controlling the operation of the portable terminal 100. For example, when the portable terminal 100 is a slide type portable phone, the sensing unit 140 may sense whether the slide phone is open or closed. Other examples include the sensing unit 140 sensing the presence or absence of power provided by a power supply 190, the presence or absence of a coupling or other connection between the interface 170 and an external device, or the like. Meanwhile, the sensing unit 140 may include a proximity sensor 141, which will be described later in relation to the touch screen.

The interface 170 may be used as a link (passage or path) through which the portable terminal 100 can exchange data or the like with an external device. For example, the external devices may include wired/wireless headset ports, external power charger ports, wired/wireless data ports, card sockets, e.g., memory card ports, ports for coupling equipment having an identification module, audio input/output (I/O) ports, video I/O ports, earphone ports, among others. Here, the identification module is implemented as a chip to store various types of information to authorize an authorization right for the portable terminal 100, and may include User Identity Module (UIM) cards, Subscriber Identity Module (SIM) cards, Universal Subscriber Identity Module (USIM) cards, and so on. A device having the identification module (hereinafter, will be referred to as 'identification device') may be implemented in the form of a smart card. Accordingly, the identification device may be connected to the portable terminal 100 via a port. The interface 170 may be used to receive inputs (e.g., data, information, power, etc.) from an external device and transfer the received inputs to one or more elements within the portable terminal 100 or may be used to transfer data from the portable terminal to an external device.

When the portable terminal 100 is connected to an external cradle, the interface 170 may serve as a passage through which power from the external cradle is supplied to the portable terminal 100, or a passage through which each kind of command signals input from the external cradle by a user are transmitted to the portable terminal 100. Said each kind of command signals input from the external cradle, or said power may operate as signals for recognizing that the portable terminal 100 has been precisely mounted to the external cradle.

The output unit 150 is configured to provide outputs in a visual, audible, and/or tactile manner (e.g., audio signal, video signal, alarm signal, etc.). The output unit 150 may include the display 151, an audio output module 152, an alarm unit 153, and the like.

The display 151 may output information processed in the portable terminal 100. For example, when the portable terminal 100 is in the phone call mode, the display 151 may display a User Interface (UI) or a Graphic User Interface (GUI) associated with a call or other communication on a screen display thereof. When the portable terminal 100 is in the video call mode or the image capturing mode, the display 151 may display a captured and/or received image, a UI, a GUI, and the like on its screen display.

Meanwhile, when the display 151 and the touch pad are overlaid in a layered manner to form a touch screen, the display 151 may function as both an input device and an output device. The display 151 may include at least one of a Liquid Crystal Display (LCD) panel, a Thin Film Transistor-LCD (TFT-LCD) panel, an Organic Light Emitting Diode (OLED) display, a flexible display screen, a three-dimensional (3D) display screen, or the like. Among others, some displays may be configured to be transparent so as to be seen from outside therethrough. This may be referred to as a transparent display, such as a Transparent LCD, or the like. The portable terminal 100 may include two or more display (or other display means) 151 according to its desired implementation. The touch screen may be configured to sense a location and area of a touch input as well as a pressure of a touch input.

Meanwhile, a proximity sensor 141 may be arranged at an inner region of the portable terminal covered by the touch screen, or near the touch screen. The proximity sensor 141 refers to a sensor to sense presence or absence of an object approaching to a surface to be sensed, or an object disposed near a surface to be sensed, by using an electric field or infrared rays without a mechanical contact. The proximity sensor has a longer lifespan and a more enhanced utilization degree than a contact sensor. Examples of such proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on.

Among these, an operation principle of the high-frequency oscillation type proximity sensor is as follows: in a state that a high frequency full wave is oscillated in the oscillatory circuit, if an object to be sensed approaches a sensor surface, an oscillation amplitude of the oscillatory circuit is reduced or stopped. Such change is converted into an electrical signal, thus to detect the presence or absence of the object to be sensed. Accordingly, although any material, other than a metallic material, is positioned between the high-frequency oscillation type proximity sensor and the object to be sensed, a proximity switch may detect the object to be sensed without being interfered by the object.

Even though the proximity sensor 141 is not mounted, if the touch screen is a static pressure type, it may be configured to detect the proximity of the pointer by a change of an electric field due to the proximity of the pointer.

Therefore, even though the pointer is positioned to be proximate onto the touch screen without actually contacting the touch screen, a position of the pointer and a distance between the pointer and the touch screen may be detected. Hereinafter, for convenience in explanation, a status that the pointer is positioned to be proximate onto the touch screen without contact will be referred to as 'proximity touch', whereas a status that the pointer substantially comes in contact with the touch screen will be referred to as 'contact touch'. The pointer in a status of 'proximity touch' is positioned so as to be vertical with respect to the touch screen.

The proximity sensor 141 senses proximity touch, and proximity touch patterns (e.g., distance, direction, speed, time, position, moving status, etc.). Information relating to the sensed proximity touch, and the sensed proximity touch patterns may be output onto the touch screen.

The audio output module 152 may output audio data received from the wireless communication unit 110 or stored in the memory 160 in a call signal reception mode, a call mode, a recording mode, a voice recognition mode, a broadcast reception mode, and the like. Also, the audio output module 152 may provide audible outputs related to a particular function (e.g., a call signal reception sound, a message reception sound, etc.) performed by the portable terminal 100. The audio output module 152 may include a speaker, a buzzer, or the like.

The alarm 153 may provide outputs to inform about the occurrence of an event of the portable terminal 100. Typical events may include a call signal reception, a message reception, a key signal input, a touch input, and the like. In addition to audio or video outputs, the alarm 153 may provide outputs in a different manner to inform about the occurrence of an event. For example, the alarm 153 may provide outputs in the form of vibrations (or other tactile means). When a call signal, a message, or some other incoming communication is received, the alarm 153 may provide tactile outputs (i.e., vibrations) to inform the user. By providing tactile outputs, the user can recognize the occurrence of various events. Outputs informing about the occurrence of an event may be also provided via the display 151 or the audio output module 152.

The memory 160 may store software programs or the like used for the processing and controlling performed by the controller 180, or may temporarily store inputted/outputted data (e.g., a phonebook, messages, still images, video, or the like.). In addition, the memory 160 may store data regarding various types of vibrations and sounds outputted when the touch screen is touched.

The memory 160 may include at least one type of storage medium including a flash memory type, a hard disk type, a multimedia card micro type, a card-type memory (e.g., SD or XD memory, or the like), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. Also, the portable terminal 100 may cooperate with a web storage device on the internet that remotely performs the storage function of the memory 160.

The portable terminal 100 also includes the controller 180 that typically controls the overall operations of the portable terminal 100. For instance, the controller 180 performs the control and processing associated with voice calls, data communications, instant message communications, video calls, and the like. The controller 180 may also include a multimedia module 181 for providing multimedia reproduction functions. The multimedia module 181 may be configured as part of the controller 180, or may be implemented as a separate component.

The controller 180 may perform a pattern recognition processing in which a handwriting input and a picture-drawing input performed on the touch screen are respectively recognized as a text and an image.

In addition, the power supply 190 provides power used by the various components for the portable device under the control of the controller 180. The provided power may be internal power, external power, or combinations thereof.

Various functionalities described herein may be implemented in a computer-readable medium using, for example, computer software, hardware, or any combination thereof. For a hardware implementation, the functionalities described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such functionalities may be implemented by the controller 180. For a software implementation, the functionalities such as operation procedures or functions may be implemented together with separate software modules that allow performing of at least one function or operation. Software codes can be implemented by a software application written in any suitable programming language. The software codes may be stored in the memory 160 and executed by the controller 180.

Hereinafter, descriptions of a shape and a structural characteristic of the portable terminal according to exemplary embodiments of the present invention will be given with reference to FIGS. 2 to 12.

Figure 2:
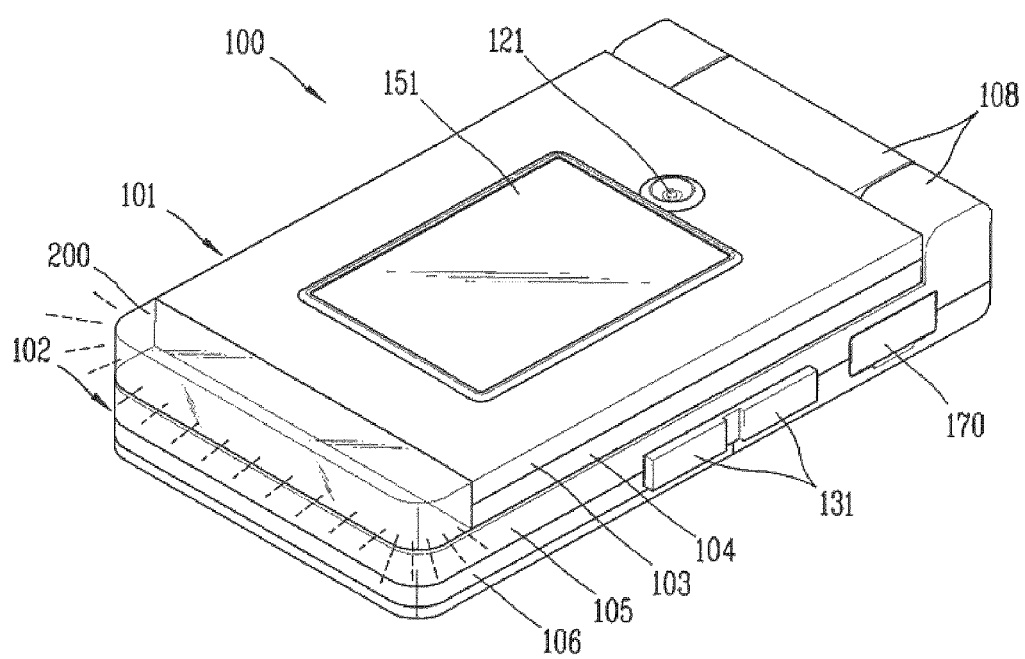
FIG. 2 is a front perspective view of a closed configuration of the portable terminal according to one exemplary embodiment of the present invention.
Figure 3:
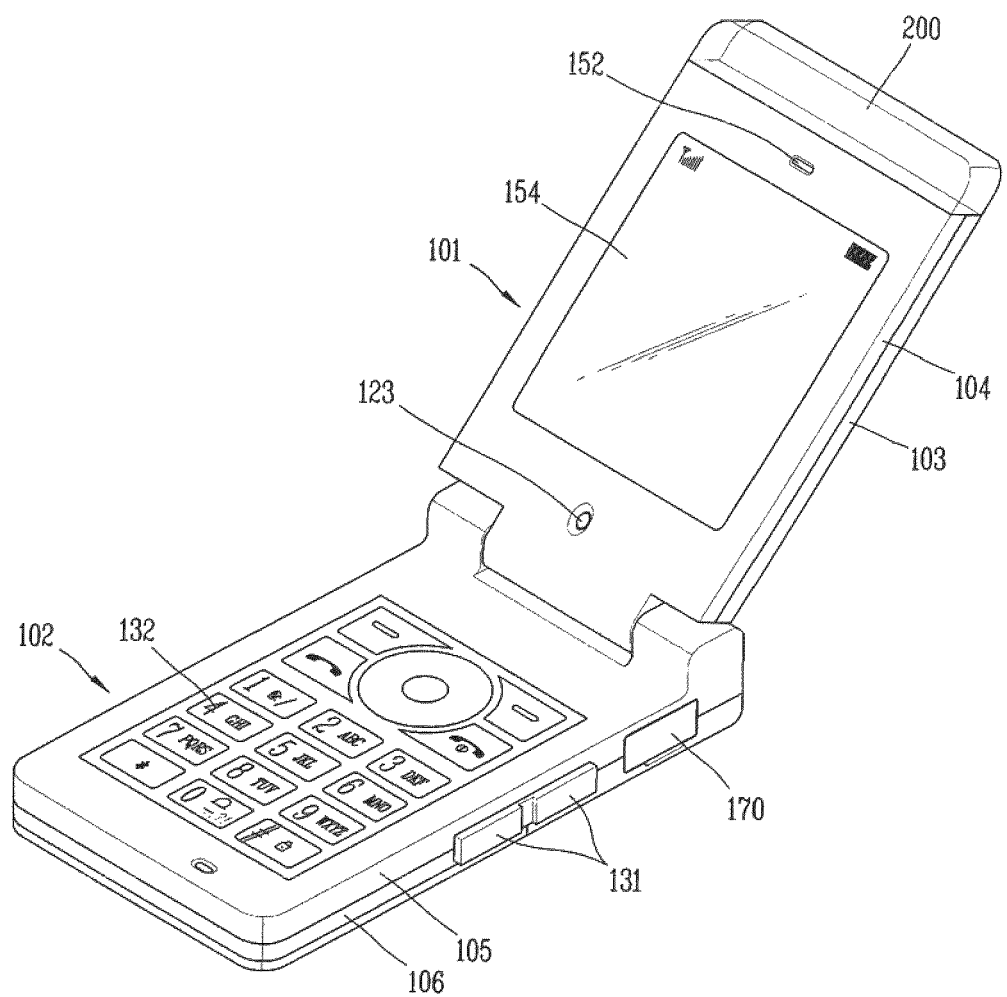
FIG. 3 is a front perspective view of an opened configuration of the portable terminal in FIG. 2.

FIG. 2 is a front perspective view of a closed configuration of the portable terminal according to one exemplary embodiment of the present invention. FIG. 3 is a front perspective view of an opened configuration of the portable terminal in FIG. 2. Referring to FIGS. 2 and 3, the portable terminal 100 includes a first body 101 and a second body 102 coupled to be foldable relative to one another.

Figure 11:
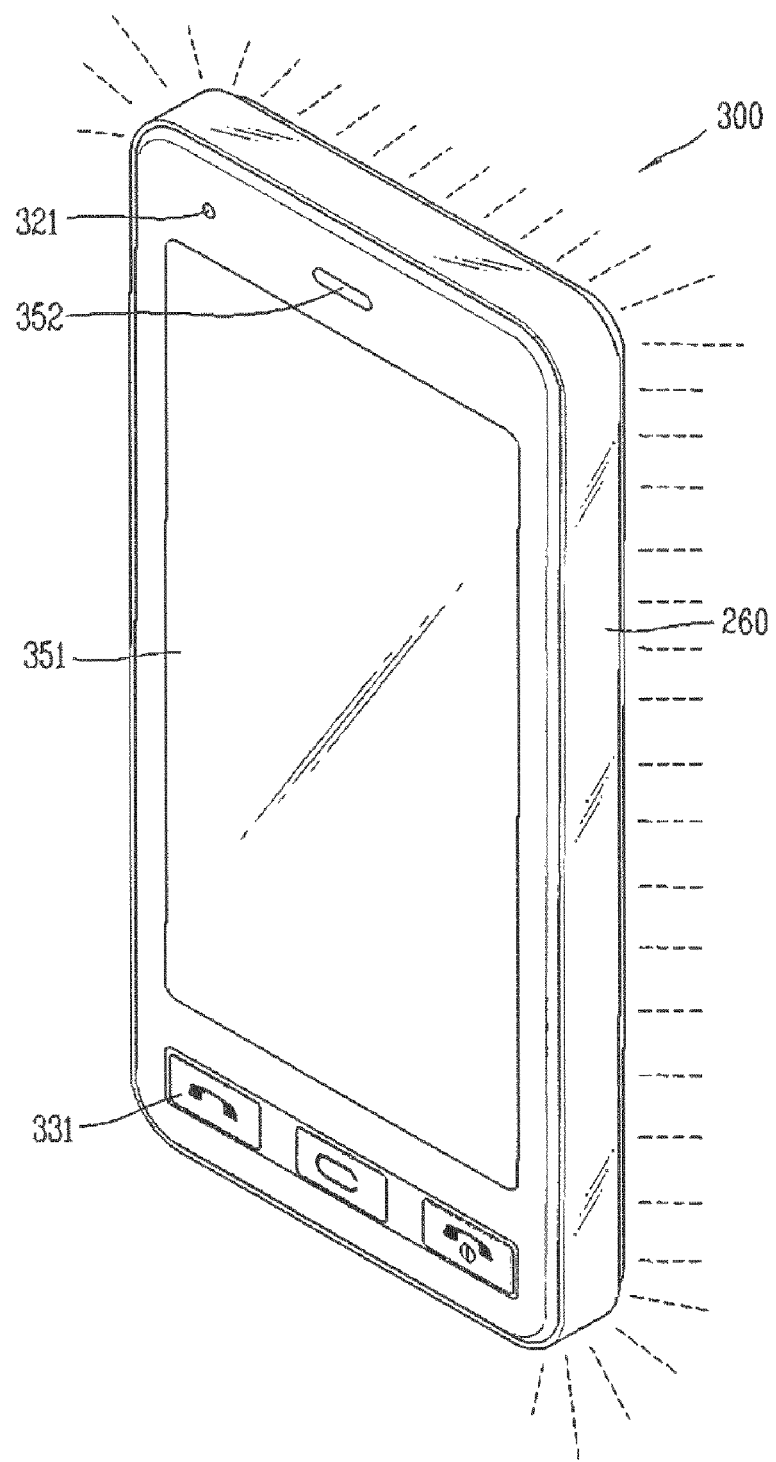
FIG. 11 is a perspective view showing a portable terminal having the transparent cover member according to another exemplary embodiment of the present invention.
Figure 12A:
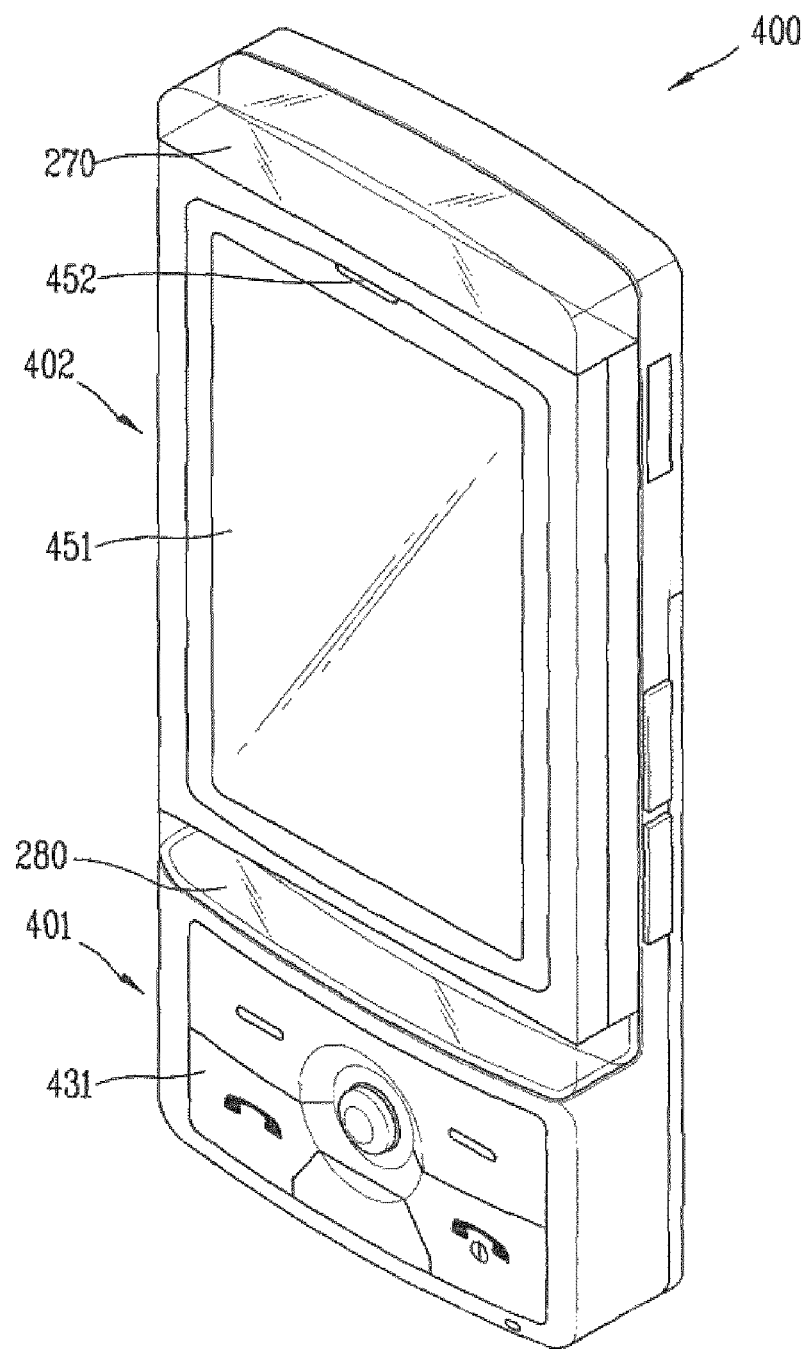
FIGS. 12A and 12B are respective perspective views showing a portable terminal having the transparent cover member according to still another exemplary embodiment of the present invention.
Figure 12B:
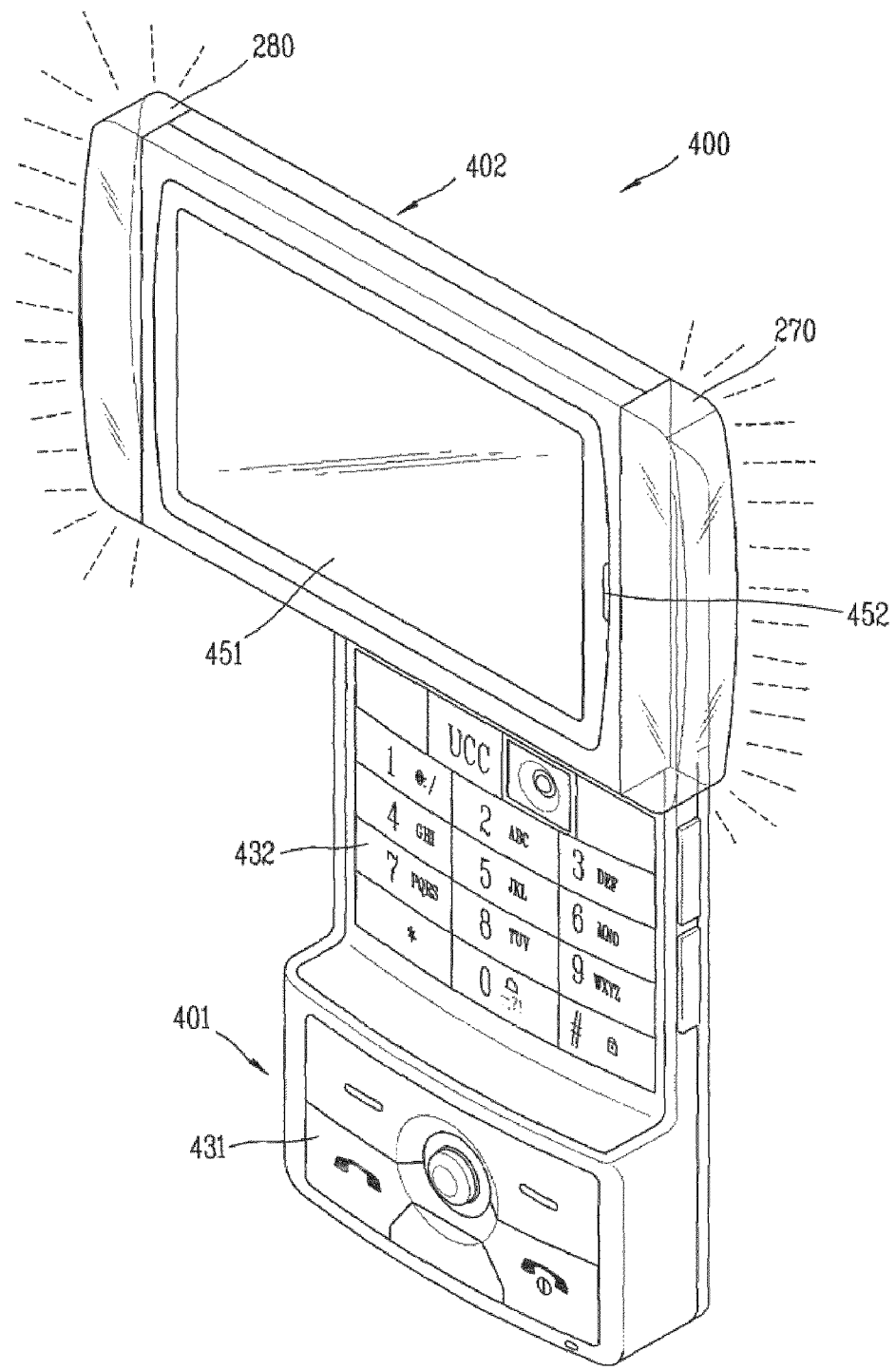

The present invention is not limited to the type of the portable terminal disclosed in FIGS. 2 and 3, and may also be applied to the portable terminal having only one body as shown in FIG. 11, and a swing-type portable terminal, as shown in FIGS. 12A and 12B, having a first body and a second body disposed to swing along at least one direction relative to one another. It may further be applied to a so-called slide-type portable terminal, as well as other types of terminals.

A state in which a front surface of a second body 102 is exposed as shown in FIG. 3 may be called an "opened configuration," and a state in which a first body 101 is disposed to overlap with or overlie the exposed front surface of the second body 102 as shown in FIG. 2 may be called a "closed configuration."

In the closed configuration, the portable terminal 100 may operate in a standby mode (idle mode), and the standby mode may be released according to a user manipulation. The portable terminal 100 operates mainly in the calling mode, an editing mode, or the like in the opened configuration, and it can be changed to the standby mode with the lapse of a certain time period or a user manipulation.

The portable terminal 100 is connected to another terminal positioned at a different location, a base station or a relay station so as to form a network. The portable terminal 100 allows a user to perform wireless voice/video or text communication with another terminal or an Internet access. In addition, the portable terminal 100 is equipped with a means to wirelessly receive a radio broadcast signal or a TV broadcast signal such that a user views broadcast at an area where the user is located.

Referring to FIG. 2, a first display 151, a first camera 121 and a transparent cover member 200 may be disposed on an outer surface of the first body 101.

The first body 101 may include an outer case 103 forming an external appearance and an inner case 104. The case (a casing, a housing, a cover, and the like) are formed from a suitably ridge material such as injection molded plastic, or formed using metallic material such as stainless steel (STS), titanium (Ti) or the like.

The first display 151 may be configured to output a variety of state information of the portable terminal 100, user contents, and the like, without requiring opening the first body 101. The second body 102 may include an inner case 105 and an outer case 106.

When the first body 101 is in the closed configuration as shown in FIG. 2, the first camera 121 may be activated when a user wants to capture his own image (self-image capturing) or to transmit his own image in a video telephony call mode. In this instance, the image of the user may be outputted to the first display 151.

The transparent cover member 200 serves to transmit light from light-emitting members disposed inside the transparent cover member 200 to an outside. In particular, as will be described later, the transparent cover member 200 enables the user to see light from the light-emitting members in an essentially uniformly scattered manner, not being focused on a certain position.

The transparent cover member 200 is configured to implement a variety of illumination effects by transmitting light from the light-emitting member to the outside in various operating modes of the portable terminal 100. For instance, if a phone call or a text message is received, the portable terminal 100 may provide an illumination effect corresponding to such event (receiving a phone call or a text message) through the transparent cover member 200. In addition, a variety of state information of the portable terminal 100 may be displayed through an optical signal (e.g., intensity and color of light, time and frequency to be illuminated, area to be illuminated, and the like) of the light-emitting member.

Referring to FIG. 2, the first body 101 and the second body 102 are coupled by a hinge 108. A cam mechanism for providing elasticity to the first body 101 while the first body 101 is rotated, and a connection means for electrically connecting the first body 101 and the second body 102 are disposed inside the hinge 108.

Referring to FIG. 3, the audio output unit 152, a second video input unit 123, and a second display 154 are installed on an inner surface of the first body 101.

The audio output unit 152 may be implemented in the form of a receiver or a loud speaker.

The second video input unit 123 may be implemented as a camera module to be suitable for capturing images or video with respect to the user and so on.

The second display 154 outputs various user interfaces in respective operational modes of the portable terminal 100, information being edited, user contents, and the like. A display screen outputted on the second display 154 may vary according to the disposition of the portable terminal 100.

The first display 151 and the second display 154 may include a Liquid Crystal Display (LCD) display, an Organic Light Emitting Diode (OLED) display, a Transparent display, e-paper, or the like that visually displays information. The first and second displays 151 and 154 may further include a touch recognition means to enable an inputting of information by a user's touch.

Referring to FIG. 3, a keypad 132, an audio input unit 122, side keys 131, an external interface 170 and the like may be disposed at the second body 102.

The keypad 132 and the side keys 131 may be generally referred to as the manipulation unit, and various techniques can be employed for implementing the manipulation unit so long as they can be operated by a user in a tactile manner. For example, the manipulation unit can be implemented with a dome switch or a touch screen, a touch pad that can receive user commands or information according to a user's pressing, pushing or touching, or implemented in the form of a wheel that rotates a key, a jog element, a joystick, or the like.

In terms of their functions, the keypad 132 is used for inputting characters, numbers, and commands such as start, end, scroll or the like, and the side keys 131 may operate as a hot key for performing a particular function within the portable terminal, such as controlling adjustable states (e.g., volume, brightness, menu search, and the like), activating the video input units 121 and 123, or the like.

The external interface 170 may be used as a link (passage or path) through which the portable terminal 100 can exchange data or the like with an external device. For instance, the external interface 170 may include at least one of wired/wireless earphone ports, Infrared Data Association (IrDA) ports, and wireless LAN ports. And, the external interface 170 may be configured as sockets for accommodating external cards, such as Subscriber Identity Module (SIM) cards, User Identity Module (UIM) cards, or memory card ports for information storage.

Figure 4:
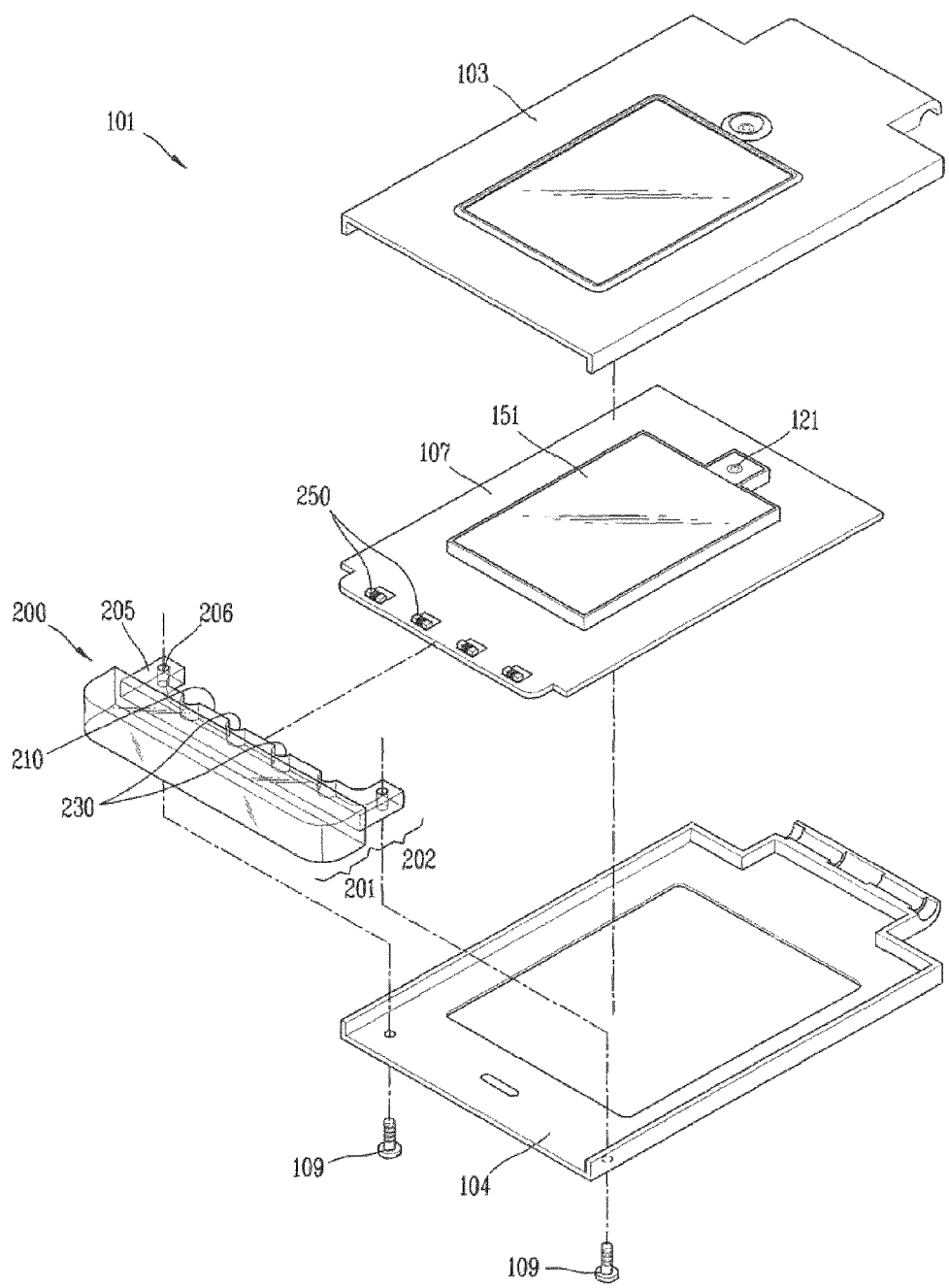
FIG. 4 is an assembled view of a first body illustrating a transparent cover member according to one exemplary embodiment of the present invention.
Figure 5:
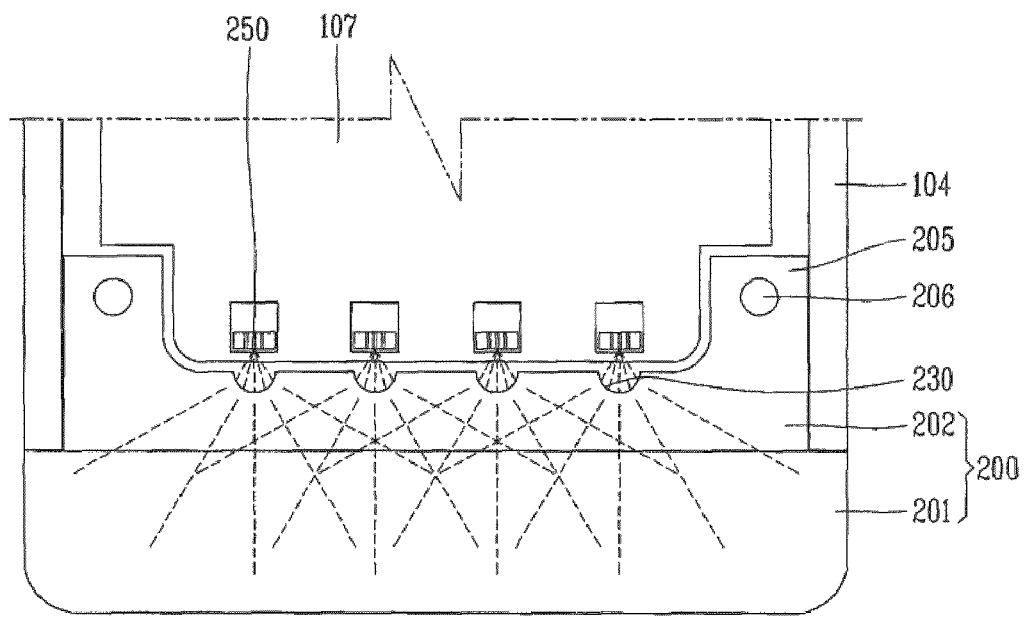
FIG. 5 is a plane view showing an arrangement between light-emitting members and the transparent cover member in FIG. 4.

FIG. 4 is a disassembled view of a first body illustrating a transparent cover member according to one exemplary embodiment of the present invention. FIG. 5 is a plane view showing an arrangement between light-emitting members and the transparent cover member in FIG. 4.

Referring to FIG. 4, the first body 101 includes the outer case 103 and the inner case 104. The first display 151, the second display 154, a substrate 107, and the like are disposed at a space formed between the cases 103 and 104.

The light-emitting members 250 for emitting light are mounted at one side of the substrate 107 so as to implement uniform illumination effects through the transparent cover member 200. Such light-emitting members 250 may be implemented in the form of a Light-Emitting Diode (LED) for reducing power loss and lowering a unit cost, although other types of light-emitting sources 250 may be used.

A plurality of light-emitting diodes may be disposed at certain intervals so as to provide uniform brightness to the light incident surface.

The light-emitting member 250 may be implemented in a single color or multiple-colors. As an illustration, when a plurality of segments of light-emitting diodes, each LED capable of implementing red (R), green (G) and blue (B), are combined, additional colors on the spectrum may be implemented, for example, by turning on/off the segments.

In addition, the light-emitting member 250 may be implemented as an illumination material (or element), such as an Electroluminescent (EL) Sheet for surface emitting.

The transparent cover member 200 includes a first portion 201 which is not covered by the cases 103 and 104 and therefore is exposed outside the cases 103 and 104, and a second portion 202 which is accommodated and coupled to the cases 103 and 104. The transparent cover member 200 may also be understood or referred to as 'transparent decorative member,' 'transparent exposure member,' 'transparent frame member,' or the like. For purposes of this disclosure, the term 'transparent' refers to both transparent and translucent (semi-transparent).

The first portion 201 of the transparent cover member 200 partially forms the external appearance of the portable terminal 100. The first portion 201 may have a variety of modified shapes from a decorative perspective, and the present invention is not limited to the shape or configuration shown in FIG. 4.

Referring to FIG. 4, the second portion 202 of the transparent cover member 200 includes protrusions 205 each having a coupling hole 206 therein such that the second portion 202 is coupled to the cases 103 and 104 by using screws 109. Such protrusions 205 serve to provide a supporting force enough for the transparent cover member 200 to be stably fixed to the first body 101 even when an external impact or force is applied to the first portion 201. Since the protrusions 205 are integrally formed with the transparent cover member 200, there is no need to have an additional member.

The second portion 202 may be formed thinner than the first portion 201 such that a total thickness of the outer case 103, the inner case 104 and the second portion 202 corresponds to a thickness of the first portion 201.

Since the second portion 202 is covered by the cases 103 and 104, diffusing dyes and the like may be provided to uniformly scatter light without affecting the transparent degree of the first portion 201.

Figure 6:
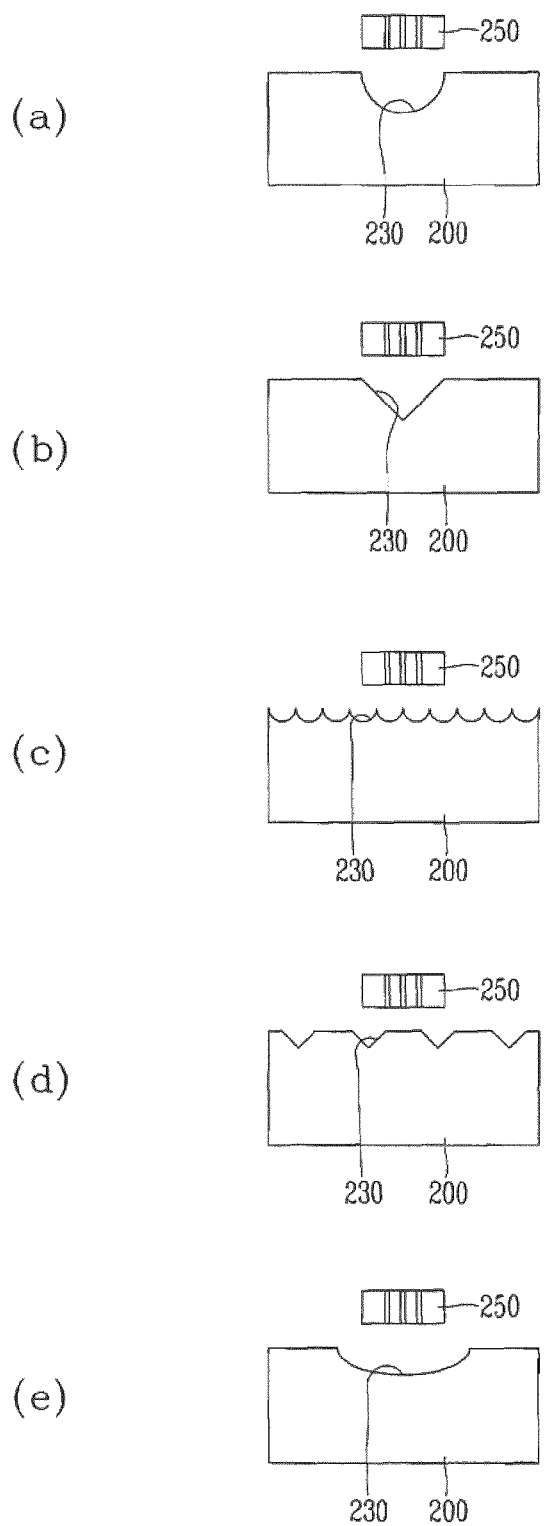
FIGS. 6(a) to 6(e) are respective plane views schematically showing modified examples of a first pattern.
Figure 8:
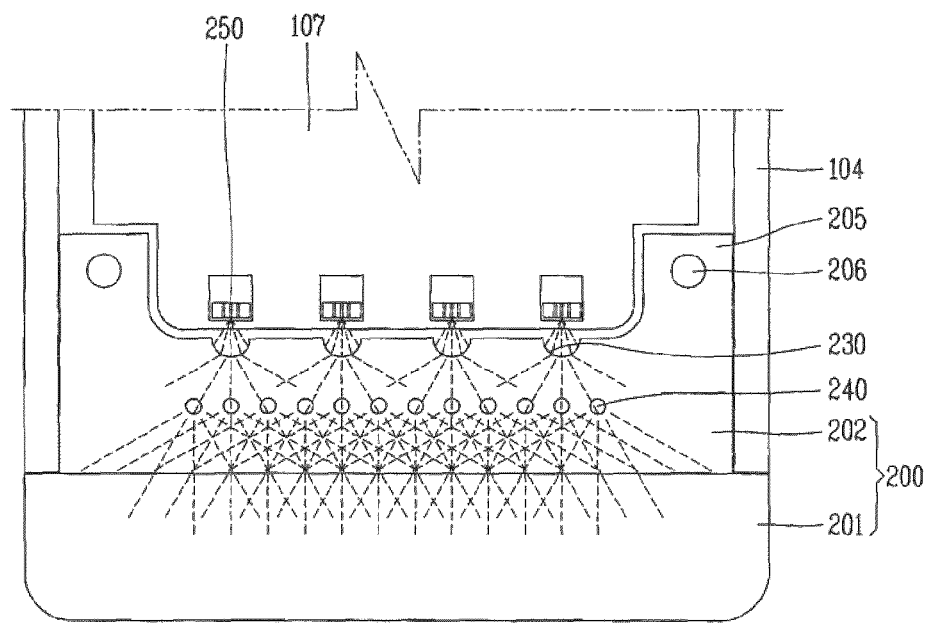
FIG. 8 is a plane view showing an arrangement between the transparent cover member and the light-emitting members in FIG. 7.
Figure 9:
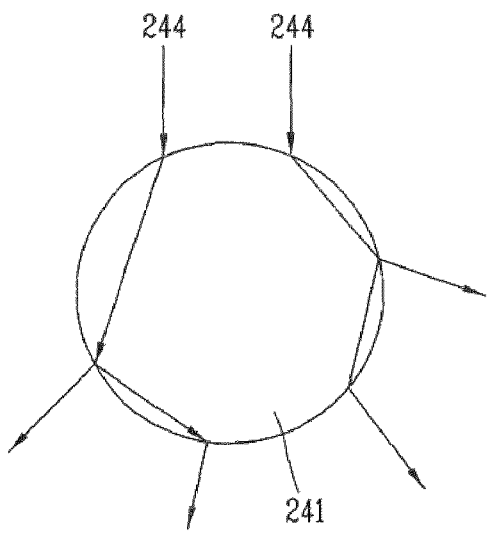
FIG. 9 is a schematic view showing a path of light passing through a second pattern according to one exemplary embodiment of the present invention.
Figure 10:
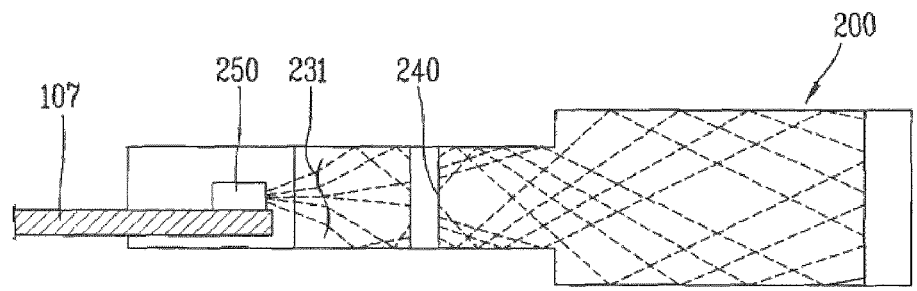
FIG. 10 is a cross-sectional view of the transparent cover member illustrating another exemplary light diffusion pattern portion according to one exemplary embodiment of the present invention.

The transparent cover member 200 also includes a light diffusion pattern portion for scattering light from the light-emitting members 250 such that any specific areas on the light incident surface (i.e., areas where the light emitting members 250 are formed) are prevented or essentially prevented from being a bright spot. The light diffusion pattern portion may be formed on a light incident surface 210 of the transparent cover member 200 as shown in FIGS. 4 to 6, or inside the transparent cover member 200 as shown in FIGS. 8 to 10. Here, the light diffusion pattern portion as shown in FIGS. 4 to 6 is referred to as a first pattern 230, and the light diffusion pattern portion formed inside the transparent cover member 200 as shown in FIGS. 8 to 10 is referred to as a second pattern 240.

Referring to FIGS. 4 and 5, the first patterns 230 are formed to have a dented shape inwardly toward the light incident surface 210 of the transparent cover member 200. The number of such first patterns 230 may correspond to that of the light-emitting members 250, or in other embodiments, they may be greater than that of the light-emitting members 250.

The dented (concave) first patterns 230 scatter light from the light-emitting members 250 to a large angle just as a concave lens does. Consequently, they may highly reduce the concentration of that light from the light-emitting members 250 on the respective target incident areas. In addition, the first patterns 230 are formed on the light incident surface 210 of the transparent cover member 200, thereby covering components inside the first body 101 as well as maintaining the outer appearance of the portable terminal 100.

FIGS. 6(*a*) to 6(*e*) are respective plane views schematically showing modified examples of a first pattern. The first pattern 230 may have a variety of dented shapes.

For instance, the first pattern 230 may have different profiles, such as a semicircle (round) as shown in FIGS. 6(*a*) and 6(*c*), a triangle in FIGS. 6(*b*) and 6(*d*), or an oval in FIG. 6(*e*).

Such profiles may be formed to have a size smaller than the light-emitting members 250, and consecutively arranged at certain intervals therebetween. More specifically, in FIG. 6(*c*), smaller-sized semicircles are consecutively arranged, and in FIG. 6(*d*), smaller-sized triangles are consecutively arranged at certain intervals therebetween.

Figure 7:
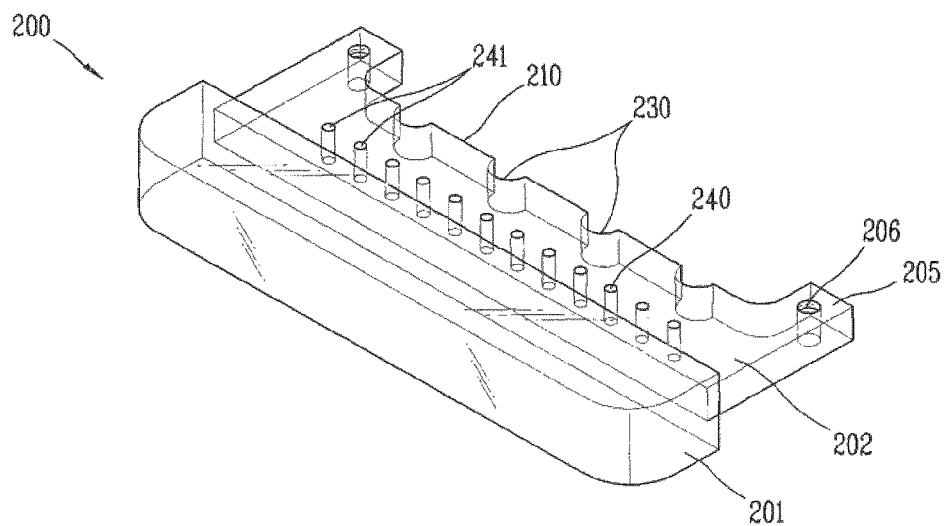
FIG. 7 is a perspective view of the transparent cover member having another light diffusion pattern portion.

FIG. 7 is a perspective view of the transparent cover member having another light diffusion pattern portion. FIG. 8 is a plane view showing an arrangement between the transparent cover member and the light-emitting members in FIG. 7.

Referring to FIGS. 7 and 8, the second portion 202 of the transparent cover member 200 includes a first pattern 230 and a second pattern 240. The first pattern 230 may have the same structure as described above, or a different pattern. Further, the light diffusion pattern portion may include the second pattern 240 only, without having the first pattern 230. Still other configurations of light diffusion patterns are possible.

In one exemplary embodiment, the second pattern 240 may include a plurality of through holes 241 spaced apart from the light incident surface 240. The through holes 241 may be linearly disposed parallel to the light-emitting members 250.

With such arrangement of the through holes 241, the transparent cover member 200 may serve to prevent the components in the portable terminal 100 from being viewed from the outside, in addition to enhancing the overall aesthetic appeal of the portable terminal 100 using the presentation of patterned light as described herein. In this instance, an interval between the adjacent through holes 241 may be formed to be smaller than that between the adjacent light-emitting members 250 such that, if the light-emitting members 250 are not lighted, it effectively prevents the light-emitting members 250 or other internal components from being viewed from the outside.

FIG. 9 is a schematic view showing a path of light passing through a second pattern according to one exemplary embodiment of the present invention. An inner wall of each through hole 241 is formed such that light having been incident onto the light incident surface 210 is refracted by the plurality of the through holes 241. The inner walls may be formed to be transparent or semi-transparent. As shown in FIG. 9, light 244 from each light-emitting member 250 is reflected or refracted at various angles while passing through the second pattern 240, thereby enhancing light diffusion.

FIG. 10 is a cross-sectional view of the transparent cover member illustrating another exemplary light diffusion pattern portion according to one exemplary embodiment of the present invention. Referring to FIG. 10, the first pattern 231 is engraved inside the light incident surface. More specifically, the first pattern 231 may be created with a certain shape by using a laser incident on the upper and lower surfaces of the transparent cover member 200. The first pattern 231 may have various geometrical shapes. The first pattern 231 may effectively diffuse light from the light-emitting members 250.

FIG. 11 is a perspective view showing a portable terminal having the transparent cover member according to another exemplary embodiment of the present invention. Referring to FIG. 11, the transparent cover member 260 is mounted at a portable terminal 300 having one terminal body. The transparent cover member 260 is configured to form at least one of edge portions of the terminal body. In addition, the transparent cover member 260 is configured to form two or more adjacent edges of edge portions of the terminal body. In FIG. 11, the transparent cover member 260 is formed along all edges of the terminal body. Although not shown, structures and arrangements of the light-emitting members and the transparent cover member 260 may be the same as or similar to those in FIGS. 3 to 10. That is, the transparent cover member 260 may enable light from the light-emitting members to be uniformly spread, without highlighting or dimming a certain area.

FIGS. 12A and 12B are respective perspective views showing a portable terminal having the transparent cover member according to still another exemplary embodiment of the present invention. As shown in the drawings, the portable terminal 400 having transparent cover members 270 and 280 includes a first body 101 having a keypad 432, and a second body 402 coupled to the first body 101 so as to swing with respect to the first body 101. An audio output unit 452 and a display 451 may be formed at the second body 102. In this example, the transparent cover members 270 and 280 are respectively installed at both ends of the second body 402. Each transparent cover member 270 and 280 is configured to provide different illumination signals according to the operational modes of the portable terminal 400.

In the portable terminal according to the present invention, the light diffusion pattern portion is formed at the transparent cover member. Accordingly, it may prevent light from the light-emitting members from being focused on certain areas where the light-emitting members are formed.

According to one exemplary embodiment of the present invention, since the light diffusion pattern portion is formed at the transparent cover member, there is no need to have a separate member for diffusing light, thus to simplify manufacturing process and reduce manufacturing cost.

The light diffusion pattern portion according to certain embodiments of the present invention may minimize deterioration in the aesthetic effect of the portable terminal by covering the internal components or structure of the transparent cover member.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising:
   a body comprising at least one case;
   a plurality of light emitting members formed within the body; and
   a transparent cover member disposed at an edge of the body, the transparent cover member comprising a first diffusion pattern configured to diffuse light received from the plurality of light emitting members and a second diffusion pattern configured to diffuse light received from the first diffusion pattern,
   wherein the transparent cover member comprises first and second portions, the first portion being externally exposed and the second portion being internal to the at least one case.

2. The portable terminal of claim 1, wherein the second diffusion pattern comprises a plurality of through holes.

3. The portable terminal of claim 2, wherein an interval between adjacent through holes is less than an interval between adjacent light emitting members.

4. The portable terminal of claim 1, wherein the first diffusion pattern comprises an indentation on a light incident surface of the transparent cover member.

5. The portable terminal of claim 1, wherein the second portion further comprises a plurality of protrusions, each protrusion comprising a coupling hole for connecting the transparent cover member to the at least one case.

6. The portable terminal of claim 1, wherein the light emitting members comprise light emitting diodes.

7. The portable terminal of claim 1, wherein the first diffusion pattern comprises a pattern formed underneath a light incident surface of the transparent cover member.

8. The portable terminal of claim 4, wherein the indentation comprises any one of a semi-circular, triangular, rectangular, or oval shape.

9. The portable terminal of claim 1, further comprising a substrate, wherein the plurality of light emitting members are arranged in a row on a surface of the substrate.

10. The portable terminal of claim 9, wherein the substrate comprises a display disposed on at least one side thereof.

11. The portable terminal of claim 9, wherein the second diffusion pattern comprises a plurality of through holes arranged in a row, and wherein an interval of adjacent through holes is less than an interval of adjacent light emitting members.

12. The portable terminal of claim 1, wherein the transparent cover member is disposed at opposing edges of the body.

13. The portable terminal of claim 1, wherein the transparent cover member is disposed along the perimeter of the body.

14. A portable terminal comprising:
    at least one case;
    a substrate disposed within the at least one case;
    at least one light emitting member formed on the substrate; and
    a transparent cover member coupled to an edge of the at least one case, the transparent cover member comprising a first diffusion pattern configured to diffuse light received from the at least one light emitting member and a second diffusion pattern configured to diffuse light received from the first diffusion pattern
    wherein the transparent cover member further comprises a first portion and a second portion, the first portion being exposed to an outside of the at least one case and the second portion being disposed within the at least one case.

15. The portable terminal of claim 14, wherein the second diffusion pattern comprises a plurality of through holes arranged in a row.

16. The portable terminal of claim 15, wherein a distance between adjacent through holes is smaller than a distance between adjacent light emitting members.

17. The portable terminal of claim 14, wherein the first diffusion pattern comprises a plurality of indentations.

18. The portable terminal of claim 17, wherein the each of the indentations corresponds to one light emitting member.

19. The portable terminal of claim 14, wherein the first portion comprises a plurality of protrusions, each protrusion comprising a coupling hole for connecting the transparent cover member to the at least one case.

* * * * *